US011629068B2

(12) United States Patent
Cen et al.

(10) Patent No.: US 11,629,068 B2
(45) Date of Patent: *Apr. 18, 2023

(54) METHOD FOR STORING ENERGY AND GENERATING ELECTRIC POWER AND A DEVICE FOR STORING SOLAR ENERGY AND GENERATING ELECTRIC POWER

(71) Applicant: DESOLENATOR B.V., Maastricht (NL)

(72) Inventors: Jiajun Cen, Leidschendam (NL); Wilheimus Franciscus Johannes Janssen, Maastricht (NL)

(73) Assignee: DESOLENATOR B.V., Maastricht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/046,212

(22) PCT Filed: Apr. 10, 2019

(86) PCT No.: PCT/EP2019/059169
§ 371 (c)(1),
(2) Date: Oct. 8, 2020

(87) PCT Pub. No.: WO2019/197505
PCT Pub. Date: Oct. 17, 2019

(65) Prior Publication Data
US 2021/0024375 A1 Jan. 28, 2021

(30) Foreign Application Priority Data
Apr. 12, 2018 (NL) ..................................... 2020752

(51) Int. Cl.
*C02F 1/14* (2006.01)
*H02S 40/44* (2014.01)
(Continued)

(52) U.S. Cl.
CPC .............. *C02F 1/14* (2013.01); *B01D 1/0035* (2013.01); *B01D 3/065* (2013.01); *B01D 5/006* (2013.01);
(Continued)

(58) Field of Classification Search
CPC .................................................... C02F 1/04–18
See application file for complete search history.

(56) References Cited

U.S. PATENT DOCUMENTS 9,297,366 B2 3/2016 Paripati et al.
10,358,359 B2 * 7/2019 Gershon .............. B01D 5/0003
(Continued)

FOREIGN PATENT DOCUMENTS

KR 101291768 B1 * 7/2013 .............. H01M 6/26
WO 2014181898 11/2014

OTHER PUBLICATIONS

Espacenet English translation of KR 101291768.*
(Continued)

*Primary Examiner* — Jonathan Luke Pilcher
(74) *Attorney, Agent, or Firm* — Barnes & Thornburg LLP

(57) ABSTRACT

A method for storing solar energy and generating electric power comprising the steps of utilizing a solar powered water treatment device (2) to convert non-potable water (3) into distillate (4) and concentrate (5), storing the distillate and the concentrate in a distillate storage tank (104) and a concentrate storage tank (105) respectively and feeding the distillate from the distillate storage tank and the concentrate from the concentrate storage tank to a salient gradient power device (106) to generate electric power.

7 Claims, 2 Drawing Sheets

(51) Int. Cl.
  *B01D 1/00*    (2006.01)
  *B01D 3/06*    (2006.01)
  *B01D 5/00*    (2006.01)
  *C02F 1/06*    (2023.01)
  *C02F 103/08*  (2006.01)

(52) U.S. Cl.
  CPC ............... *C02F 1/06* (2013.01); *H02S 40/44* (2014.12); *C02F 2103/08* (2013.01); *C02F 2201/009* (2013.01)

(56) References Cited

U.S. PATENT DOCUMENTS

| | | | | |
|---|---|---|---|---|
| 10,696,565 B2* | 6/2020 | Janssen | ..................... | B01L 3/00 |
| 11,235,985 B2* | 2/2022 | Cen | ..................... | B01D 1/0035 |
| 2008/0230376 A1* | 9/2008 | Brauns | ................... | B01D 61/10 |
| | | | | 204/194 |
| 2013/0168224 A1* | 7/2013 | Godshall | ................... | C02F 1/14 |
| | | | | 203/10 |
| 2015/0251923 A1* | 9/2015 | Janssen | ..................... | C02F 1/14 |
| | | | | 202/234 |
| 2018/0273402 A1* | 9/2018 | Helsen | ................... | B01D 61/58 |

OTHER PUBLICATIONS

Brauns et al, "Towards a worldwide sustainable and simultaneous large-scale production of renewable energy and potable water through salinity gradient power by combining reversed electrodialysis and solar power?" Desalination, Elsevier, Amsterdam, NL, vol. 219, No. 1-3, dated Dec. 6, 2007, pp. 312-323.

Gude Veera Gnaneswar Ed—Li Xianguo et al: "Energy storage for desalination processes powered by renewable energy and waste heat sources", Applied Energy, vol. 137, dated Jan. 1, 2015, pp. 877-898.

International Preliminary Report on Patentability for PCT/EP2019/059169 dated Oct. 13, 2020, 7 pages.

International Search Report and Written Opinion for PCT/EP2019/059169 dated Oct. 17, 2019.

* cited by examiner

METHOD FOR STORING ENERGY AND GENERATING ELECTRIC POWER AND A DEVICE FOR STORING SOLAR ENERGY AND GENERATING ELECTRIC POWER

CROSS REFERENCE TO RELATED APPLICATIONS

This application is a U.S. national stage application under 35 U.S.C. § 371(b) of International Application No. PCT/EP2019/059169 filed Apr. 10, 2019, which claims priority to the Netherlands Patent Application No. 2020752 filed on Apr. 12, 2018, the disclosures of both of which are hereby expressly incorporated by reference in their entirety.

FIELD OF THE INVENTION

The invention relates to a method for storing energy and generating electric power comprising the steps of:
feeding non-potable water to a water treatment device,
converting in the water treatment device the non-potable water into distillate and concentrate,
storing at least part of the distillate (4) from the water treatment device in a distillate storage tank,
storing the concentrate rom the water treatment device in a concentrate storage tank (105),
feeding the distillate from the distillate storage tank and the concentrate from the concentrate storage tank to a salinity gradient power device to generate electric power.

The invention further relates to a device for storing energy and generating electric power comprising:
a water treatment device for converting non-potable water into distillate and concentrate,
a distillate storage tank for storing the distillate,
a concentrate storage tank for storing the concentrate,
a salinity gradient power device for generating electric power, which salinity gradient power device has a fluid connection with the distillate storage tank and the concentrate storage tank.

BACKGROUND OF THE INVENTION

Such a method and device are known from the international patent application WO2014181898A1. WO2014181898A1 discloses a large-capacity electric power storage system using saline water. The system being capable of separating saline water into high-density saline water and fresh water and storing them using surplus power, during a low load. Power is being produced using the density difference between the high-density saline water and fresh water when power consumption increases rapidly, i.e. during a peak load.

A disadvantage of this known system is that the system needs external electric power such as from an electric power grid to be operated. It also needs external heat to be supplied through heat exchange lines to heat the high-density saline water and cool the fresh water. Furthermore it needs an addition separate fresh water tank to feed fresh water to the salinity difference power generation device.

Another disadvantage is that the known system uses fresh water throughout the whole system having the problem of mineral deposition in the pipes and other equipment of the system (i.e. smiling and fouling in the system).

SUMMARY OF THE INVENTION

At least one of the objects of the invention is to provide a method and device to be able to generate electric power at any time.

This object is accomplished with the method according to the invention in that the method also comprises the steps of:
using a solar power system to generate electric power and to heat distillate from a water treatment device,
the distillate (4) being distilled water,
using the heated distillate in the water treatment device to convert the non-potable water into distillate and concentrate,
feeding at least part of the distillate water treatment device to the solar power system,
using a part of the electric power generated by the solar power system and the salinity gradient power device as a sole source of electric power to operate the water treatment device and the salinity gradient power device,
feeding at least part of the electric power generated by the solar power system and the salinity gradient power device to an electric power grid.

By this method intermittently available solar energy is being stored in salinity gradient, i.e. salt concentration differences in water streams.

During periods with solar activity non-potable water is converted into distillate and concentrate. The distillate being distilled water. The distillate can be converted to potable water by remineralising the distillate but can also be stored in a distillate storage tank. All solar power at a solar power plant which is not needed immediately for generating electric power and/or potable water to fulfil demand, can be used for converting non-potable water into distillate and concentrate, of which the distillate and the concentrate can be stored in separate thermally insulated tanks. This provides a large advantage over traditional solar power plants which discharge a surplus of electric power or needs to store it into electrochemical/redox flow batteries or transport the excess electric energy over large distances to locations where pumped hydro-electric, compressed air or flywheel energy storage is possible. Furthermore, storing electric power in salinity gradients does not have the problem of "self-discharge" and it removes potential damages to the power grid, batteries or other electronic devices connected as a result of instabilities that may be caused by the intermittency of solar activity. At times when energy demand is higher than the solar electric power supply, i.e. at peak demand hours or during periods with less or no solar activity, the distillate from the distillate storage tank and the concentrate from the concentrate storage tank will be fed to a salinity gradient power device using the salient gradient to generate the desired amount of electric power. This electric power is referred to as osmotic power, salinity gradient power or blue energy.

The non-potable water is referred here as saline water, such as for example seawater, brackish water or brine. The non-potable water is the only source of liquid to be supplied to the device according to the invention.

The distillate is distilled water being as pure as possible and the concentrate is water with a concentration of salt being typically much higher than the original saline water. Using distilled water instead of fresh water in the device has the advantage that no or less scaling and fouling inside the device will occur due to deposition of minerals.

The electric power grid can be supplied by electric power only generated by the solar power system and the salinity gradient power device so that a complete independent system is obtained.

Due to the relatively large difference in salinity between the distillate and the concentrate, a relatively large amount of electric power can be generated.

So the method according to the invention only needs solar energy and non-potable water for generating electricity and distilled water.

It has to be noted that solar power plants are rapidly developing and well known in the art. At such solar power plants, solar irradiation is converted into electric power by means of for example photovoltaic (PV) solar panels. A main problem with such systems is that only during solar activity electric power can be generated. Another problem is that the intermittent nature of solar activity could lead to instabilities which damage the power grid, battery or other device(s) that are connected to the solar power plant. To be able to have electric power available during the night or to have additional electric power available during low solar activity periods, electric power is being stored during peak solar activity periods in accumulators such as batteries. Such batteries comprising electrochemical cells have the disadvantage that they are (i) environmentally unfriendly and/or damaging, (ii) unsafe these could lead to sparks and explosions if not handled properly and (iii) are self-discharging, meaning that they will lose the stored energy over time when not being used.

By the method according to the present invention intermittently available solar energy is being stored in salinity gradient, i.e. salt concentration differences in water streams.

An embodiment of the method according to the invention is characterized in that it comprises the step of using at least part of the distillate from the water treatment device for potable water.

In this manner based solely on solar power and salt water, electric power and potable water will be available to consumers.

Another embodiment of the method according to the invention is characterized in that the temperature of the distillate in the distillate storage tank and/or the concentrate in the concentrate storage tank is at least 30 degrees Celsius, preferably at least 40 degrees Celsius.

The distillate in the distillate storage tank is at the same or lower temperature than the concentrate.

In the concentrate where the temperature is at or above 30 degrees Celsius, the solubility of salt such as NaCl is higher than below these temperatures and the internal resistance to electric and ion transport in the salinity gradient power device is lower, which will result in higher conversion efficiencies and/or power performance.

When leaving the solar powered water treatment device, which preferably uses both solar thermal and solar electricity, the distillate and the concentrate can have a higher temperature than the temperature of non-potable water at the entrance of the solar powered water treatment device. It has an advantage to store the distillate and the concentrate at this higher temperature of at least 30 degrees Celsius, preferably at least 40 degrees Celsius and to feed the distillate and the concentrate at this higher temperature to the salinity gradient power device, since at such higher temperature the solubility of for example salt is much higher and the internal resistance is lower. Furthermore, if ion exchange membranes are being used in the salinity gradient power device, the resistance of ion transport across such membranes is lower at higher temperature so that the salinity gradient power device will work more efficiently.

Another embodiment of the method according to the invention is characterized in that the salinity gradient power device is a reversed electrodialyses (RED) device or a pressure retarded osmosis (PRO) device.

With such a reversed electrodialyses (RED) device or a PRO-device electric power can be generated.

Implementation of a RED-device is straightforward with a membrane stack where electrodes are integrated. Membrane fouling/blockage can be minimalized by regularly regenerating the membranes through either swapping the flows (distillate inlet becomes concentrate inlet and concentrate inlet becomes distillate inlet) and/or running the membrane stack on electrodialysis mode for a short period of time.

Implementation of a PRO-device might have a higher capital cost because at least an additional hydroturbine is needed. However, it is possible to access a higher percentage of useful energy (that is the Gibbs free energy of mixing minus unutilised energy, and losses as a result of internal resistances and uncontrolled mixing), thus a higher energy efficiency and power performance compared to RED using the same amount of membrane surface area.

Another embodiment of the method according to the invention is characterized in that the solar powered water treatment device uses multiple-effect distillation (MED) technology, multiple-effect distillation (MED) combined with vapour recompression (VC) technology, reverse osmosis (RO) technology or multi-stage flash distillation (MSF) technology.

With MED or MSF technologies relatively pure distillate with no or nearly no salt can be obtained. These technologies are preferred over technologies like electrodialysis (ED) and reverse osmose (RO) since the much better performance of MED or MSF technologies especially by converting seawater into concentrate and very pure distillate.

Another embodiment of the method according to the invention is characterized in that the concentrate has a salt, for example NaCl concentration of at least 0.5 mol/kg, preferably about 0.75 mol/kg.

With such concentrate in combination with the obtained distillate, a relatively large amount of electric power can efficiently be generated.

When a high electric power performance per surface area of membrane is desired the concentrate should have a salt, for example NaCl concentration as high as possible, preferably more than 0.75 mol/kg. However the conversion efficiency deceases with the increase of salt concentration. In other words, there is a trade-off between energy conversion efficiency and power performance.

Another embodiment of the method according to the invention is characterized in that a mixture of the distillate and the concentrate leaving the salinity gradient power device is fed to the solar powered water treatment device.

In this way the mixture of the distillate and the concentrate can be re-used and nearly no new non-potable water need to be used. The device can be used as a semi-closed system.

The invention also relates to a device for generating electric power, which device is characterized in that the device comprises:

a solar power system to generate electric power and to heat distillate from the water treatment device, the distillate (4) being distilled water, means to transport the heated distillate into the water treatment device to convert the non-potable water into distillate and concentrate, means to feed at least part of the distillate water treatment device to the solar power system, wherein the water treatment device and the salinity gradient power device operate solely on electric power generated by the solar power system and the salinity gradient power device), means to feed at least part of the electric power generated by the solar power system and the salinity gradient power device to an electric power grid.

When electric power is needed the distillate from the distillate storage tank and the concentrate from the concentrate storage tank are being fed to a salinity gradient power device to generate the desired amount of electric power.

An embodiment of the device according to the invention is characterized in that the reversed electrodialysis (RED) device comprises a stack of rectangular membranes, wherein the length of the membranes extending in a flow direction of distillate and concentrate through the reversed electrodialysis (RED) device is at least 15 centimetre.

The stack of membranes are alternation cation exchange membranes (CEM) and anion exchange membranes (AEM) arranged between two electrodes (an anode and a cathode). By having rectangular membranes a better performance is obtained compared to square membranes, since rectangular stacks can fit more surface area of ion exchange membranes while having a similar pressure drop across the membrane stack in the fluid flow direction and it is easier to seal or make watertight.

Another embodiment of the device according to the invention is characterized in that the height of the membranes extending perpendicular to the flow direction is at least 1.4 times larger than the length of the membranes.

With such ratio in dimensions, a pressure drop over the length over the stack of membranes is lower compared to square membranes, whilst generating the same power and fluid flow output so that sealing of the stack of membranes is easier and less electric energy is needed to pump the fluid.

Alternatively, the same rectangular design or a tubular design based on pressure retarded osmosis (PRO) can be used.

BRIEF DESCRIPTION OF THE DRAWINGS

The method and device according to the invention will further be explained with reference to the drawings, wherein.

DESCRIPTION OF PREFERRED EMBODIMENTS

Figure 1:
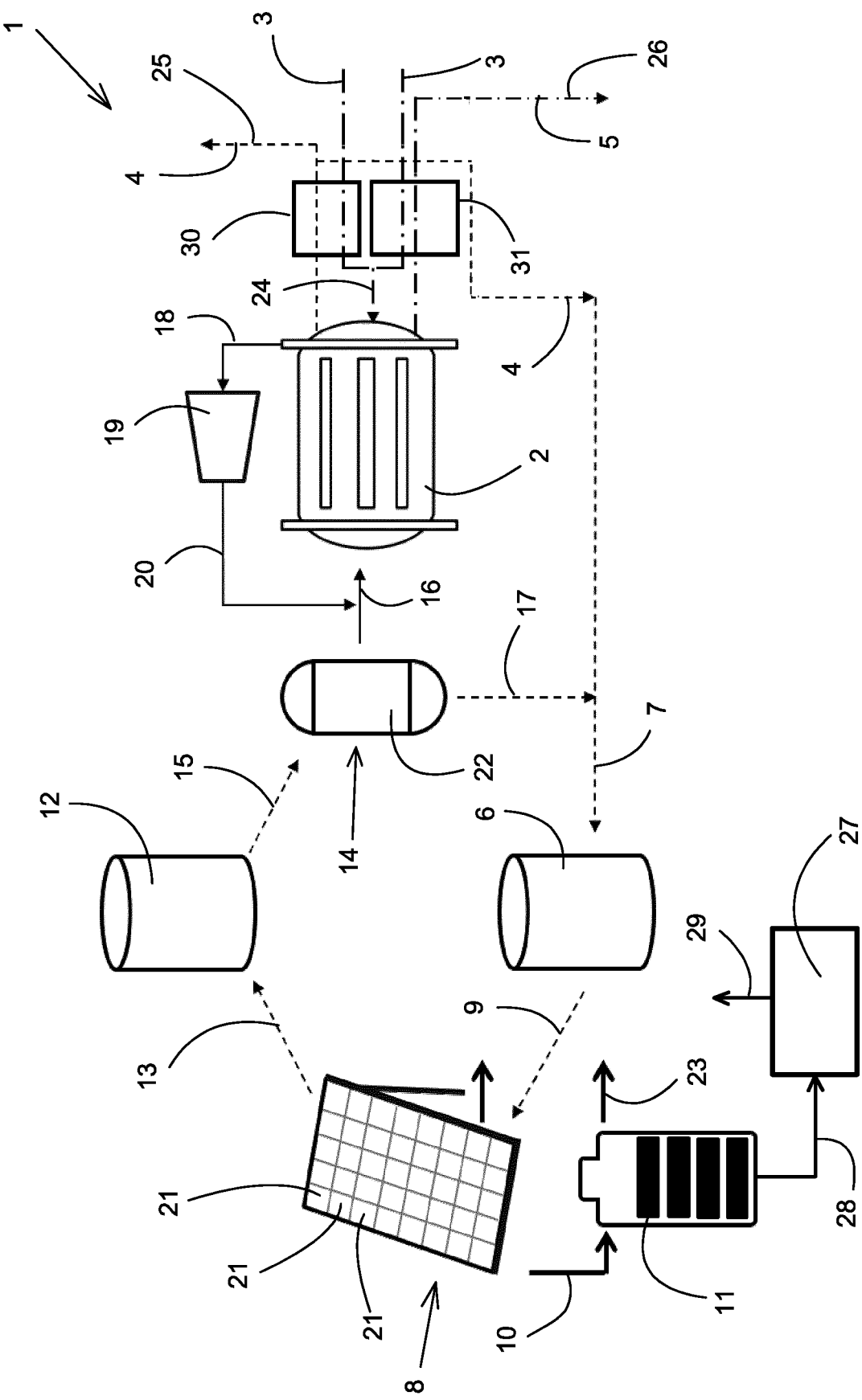
FIG. 1 is a detailed schematic view of a solar powered water treatment device, to be used in a device according to invention.

FIG. 1 shows in detail a solar powered water treatment device 1 for obtaining distillate 4 and concentrate 5 from non-potable water 5 according to the invention. The solar powered water treatment device 1 comprises a water treatment device 2 to convert the non-potable water 3 into distillate 4 and concentrate 5;

a first distillate storage tank 6 for storing a part of the distillate 4, which first distillate storage tank 6 is in fluid connection 7 with the water treatment device 2;

a solar power system 8 to produce electric power and heated water from solar power, which solar power system 8 is in fluid connection 9 with the first distillate storage tank 6 and in electrical connection 10 with a battery 11;

a second distillate storage tank 12 for storing distillate being heated in the solar power system 8, which second distillate storage tank 12 is in fluid connection 13 with the solar power system 8;

a steam generator 14 for generating steam, which steam generator 14 is in fluid connection 15 with the second distillate storage tank 12, in fluid connection 16 with the water treatment device 2 and in fluid connection 17 with the first distillate storage tank 6.

The battery 11 can power the water treatment device 2 during low or no solar activity.

An outlet of the water treatment device 2 is in fluid connection 18 with an inlet of a compressor 19 to recompress the steam leaving the water treatment device 2 and to transport the compressed steam via fluid connection 20 and the fluid connection 16 back into the water treatment device 2. This highly improves the efficiency of the solar powered water treatment device 1, and allows for 24 hours per day operation when electric power is available to the solar powered water treatment device 1.

The solar power system 8 comprises photovoltaic panels 21 to generate electric power from solar power. The solar power system 8 also comprises means to guide distillate along the photovoltaic panels 21 so that the distillate will be heated by the photovoltaic panels 21, being hot due to the solar thermal energy. To guide water along photovoltaic panels so that the water will be heated by the photovoltaic panels is known from amongst others WO2014053308 of the same inventor as this application.

The steam generator 14 comprises a flash tank 22 to convert heated distillate from the second distillate storage tank 12 into steam.

The water treatment device 2 is a multiple-effect distillation (MED) device. Such MED device is commonly known and will therefore not further be explained.

A battery 11 can be used for storing a portion of the electric power generated by the solar power system 8 which is supplied through connection 10 and providing electric power via connection 23 to the needed components of the solar powered water treatment device 1, like the compressor 19 and/or valves, pumps and/or other electric components (not shown in FIG. 1) in the fluid connection 7 between the water treatment device 2 and the first distillate storage tank 6, the fluid connection 9 between the first distillate storage tank 6 and the solar power system 8, the fluid connection 13 between the solar power system 8 and the second distillate storage tank 12, the fluid connection 15 between the second distillate storage tank 12 and the steam generator 14, the fluid connection 16 between the steam generator 14 and the water treatment device 2, the fluid connection 18 between the water treatment device 2 and the compressor 19, and/or the fluid connection 20 between the compressor 19 and the fluid connection 16 and similar components of the device 100 being explained here below.

Additional valves and/or pumps and/or other electric components like sensors operated by electrical power may be present in a pipe 24 for transporting the non-potable water 3 like salt water to the water treatment device 2, in a pipe 25 for transporting the distillate 4 away from the water treatment device 2 and in a pipe 26 for transporting the concentrate like brine away from the water treatment device 2. The solar powered water treatment device 1 can also be provided with sensors for checking the status of the components the solar powered water treatment device 1. Also these sensors can be electrically powered by the battery 11.

To easily control the several components of device 1, the solar powered water treatment device 1 comprises a controller 27 being electrically connected via line 28 to the battery 11 or the device 100 as well as electrically connected via line 29 to all components to be controlled like the valves, pumps and/or electric components like sensors, the water treatment device 2, the first distillate storage tank 6, the solar power system 8, the second distillate storage tank 12, the steam generator 22 and the compressor 19.

By means of the controller 27, the second tank 12 is being filled during periods of solar activity so that also in periods of substantially no solar activity heated water is available to be transported from the second distillate storage tank 12 to the steam generator 14.

To reuse and/or recover as much thermal energy as possible from the several flows, such as distillate 4 and concentrate 5 for further use in the solar powered water treatment device 1, a condenser 30 and a heat exchanger 31 are installed and heat exchanged with non-potable water 3. In the condenser 30 steam generated in the water treatment device 2 is heat exchanged with the non-potable water 3 to become liquefied distillate 4. Hereby a first part of the non-potable water 3 is being heated. In the heat exchanger 31, heat exchange occurs between the relatively hot condensate 5 and a second part of the relatively cold non-potable water 3 like seawater. The first part and second part of the non-potable water 3 are combined in a pipe 24 to be transported to the water treatment device 2. Alternatively, depending on the design and requirements of water treatment device 2, the non-portable water 3 can be first heat exchanged with the concentrate stream and then with the distillate stream to achieve higher temperatures in pipe 24. In any case, preheating of the non-potable water 3 to a temperature close to the fluid evaporation temperature in the respective effects is preferred.

Figure 2:
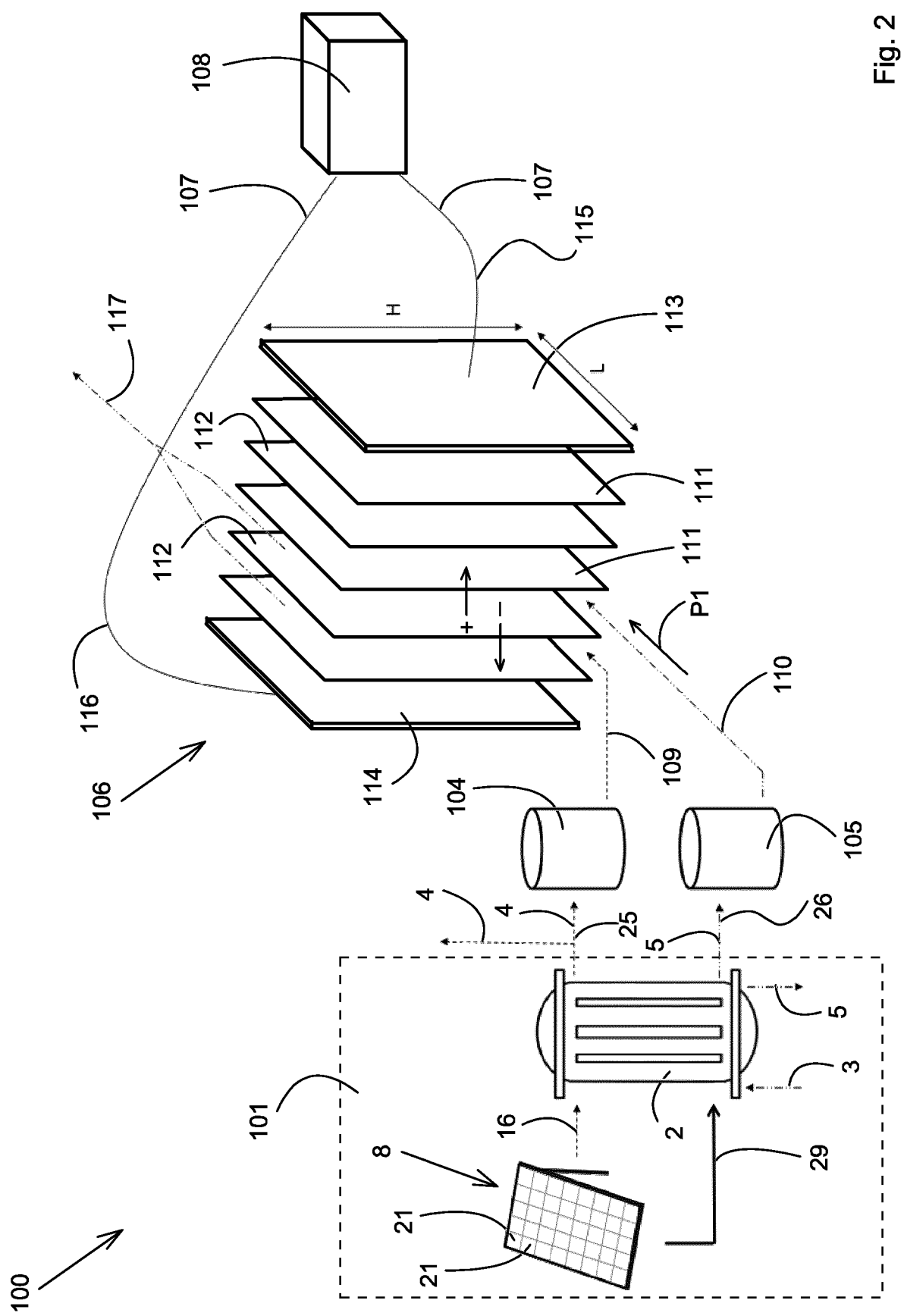
FIG. 2 is a schematic view of the device according to the invention comprising a reversed electrodialysis (RED) device.

FIG. 2 shows a schematic view of a device 100 for generating electric power according to the invention. The device 100 comprises a solar powered water treatment device 101 for converting non-potable water 3 into distillate 4 and concentrate 5, a third distillate storage tank 104 for storing the distillate 4, a concentrate storage tank 105 for storing the concentrate 5, and a salinity gradient power device 106 for generating electric power 107. The solar powered water treatment device 101 may comprise the solar powered water treatment device 1 or can be any other kind of solar powered water treatment device by means of which non-potable water is converted into distillate and concentrate. In the below description it is assumed that the solar powered water treatment device 101 comprises the solar powered water treatment device 1.

The storage tanks 6, 12, 104 and 105 are thermally insulated to prevent cooling off of the liquid contained therein and be able to use the thermal energy of the heated liquid in the process.

The electric power 107 can be transported to an electric power grid, to a load or other electronic devices 108 to be used to charge the battery 11 or to be used instead of the battery 11. The salinity gradient power device 106 being in fluid connection 109 with the third distillate storage tank 104 and in fluid connection 110 the concentrate storage tank 105.

The salinity gradient power device 106 is a reversed electrodialysis (RED) device. Such RED-device is well known in the art. The salinity gradient power device 106 comprises a stack of membranes comprising in alternation cation exchange membranes (CEM) 111 and anion exchange membranes (AEM) 112 arranged between two electrodes, an cathode 113 and a anode 114.

The cathode 113 and the anode 114 are in electric connection via wires 115, 116 to transport the electric power 107 to the electric power grid, to the load or other electronic devices 108.

The length L of the membranes 111, 112 in the reversed electrodialysis (RED) device, extending in a flow direction indicated by arrow P1 which the distillate 4 and concentrate 5 are flowing alongside is at least 15 centimetre. The height H of the membranes 111, 112 extending perpendicular to the flow direction indicated by arrow P1, at least 1.4 times larger than the length L of the membranes 111, 112.

In FIG. 2 co-current flow through the stack of membranes is shown. However, counter- or crosscurrent flow is also possible to obtain a higher yield.

To omit the need of using additional electrolyte fluids at electrodes 113, 114, such as potassium hexacyanoferrate, capacitive electrodes can be used.

The device 100 works according to the method of the invention as follows: After starting up the solar powered water treatment device 1, non-potable water 3 like seawater is transported through pipe 24 into the MED device 2, where the non-potable water 3 is converted into distillate 4 and concentrate 5 like brine. The concentrate 5 is transported through pipe 26 away from the MED device 2 to the concentrate storage tank 105.

The distillate 4 is transported through pipe 25 partly to consumers to be used for potable water, partly to the third distillate storage tank 104 and partly through fluid connection 7 to the first distillate storage tank 6. The distilled water can be converted to potable water by remineralisation.

In the first distillate storage tank 6 the distillate 4 has a temperature of for example about 40 degrees Celsius. The amount of this part of distillate is about the same as the amount of distillate turned into steam in the flash tank 22.

From the first distillate storage tank 6 the distillate is transported through fluid connection 9 to solar power system 8. In the solar power system 8 electric power is generated which is stored in battery 11. Furthermore, in the solar power system 8 the distillate coming from the first distillate storage tank 6 is being heated from for example about 40 degrees Celsius to 95 degrees Celsius or more. It is feasible using solar thermal energy to heat the distillate to 95 degrees Celsius and above. However, the higher the temperature the lower the efficiency of heating. It is preferred to heat the distillate to about 70-80 degrees Celsius and to further heat it by means of an electric boiler to the desired temperature.

The heated distillate is transported through fluid connection 13 to the second distillate storage tank 12. From the second distillate storage tank 12 the heated distillate is transported through fluid connection 15 to the steam generator 14.

During daytime in periods of solar activity, the amount of distillate coming from the solar power system 8 is more than needed for the steam generator 14 so that excess heated distillate accumulates in the second distillate storage tank 12.

During night-time in periods of no solar activity, no heated distillate will come from the solar power system 8. However, due to the stored amount of heated distillate in the second distillate storage tank 12, it is still possible to transport heated water through fluid connection 15 from the second distillate storage tank 12 to the steam generator 14. Since no heated distillate enters the second distillate storage tank 12 in night-time, the amount of heated distillate in the second distillate storage tank 12 will slowly decrease.

Most of the distillate will be produced during the day-time operation when there is solar activity. However, there should be sufficient heated distillate available in the second distillate storage tank 12 and sufficient electric power stored in battery 11 to keep the water treatment device 2 and compressor 19 running at the desired temperatures to avoid efficiency losses as a result of shutdown and restart of the solar powered water treatment device 1.

In the steam generator 14, for example in the flash tank 22, steam is generated at temperatures ranging from 60 till 80 degrees Celsius under the corresponding pressure. The steam is transported through fluid connection 16 to the MED device 2, where it is being used for dividing the non-potable water 3 using multiple effects into steam to be cooled down to distillate 4 and concentrate 5 like brine. The steam at the last effect can have a temperature of about 50-60 degrees Celsius at a corresponding pressure. During the transport of the steam through the MED device 2 the temperature of the steam slightly drops.

Liquid distillate remaining in the flash tank 22 is transported through fluid connection 17 back to the first distillate storage tank 6. The liquid distillate leaving the flash tank 22 can have a temperature of about 70 degrees Celsius. It is also possible to use other solar power systems, for example with separate units for generating electric power and for heating the distillate from the first distillate storage tank.

In an embodiment of the device according to the invention a 4-stage multiple-effect distillation (MED) device 2 has been used, whereby the water temperature going to the flash tank 22 was about 95 degrees Celsius, the steam in fluid connection 16 was 70-80 degrees Celsius and the steam in fluid connection 18 was 50-60 degrees Celsius. The whole multiple-effect distillation (MED) device 2 works under sub-atmospheric pressure. More or less than four stages can be used as a result of trade-off between design parameters.

Depending on the size of the device, an amount up to 2500 cubic metre of distillate can be produced every 24 hours. For each cubic metre an amount of about 8.5 kWh (thermal and electric) is required and generated by the solar power system 8.

For a device generating 10 cubic metre of distillate, for example, the distillate storage tanks 6, 12 can have a capacity of 5 cubic metre. The solar surface array of photovoltaic panels will need to be at least 150 square metre (depending a.o. on the geographical location and orientation) for such a device.

Since distillate flows through the first distillate storage tank 6, the solar power system 8, the second distillate storage tank 12, the flash tank 22, the compressor 19 and the fluid connections between them, there is no or nearly no scaling or fouling will occur in these components. Also in the part of the water treatment device 2 through which the steam flows no or nearly no scaling or fouling will occur. Moreover in the part of the water treatment device 2 through which the steam (water vapour) and distilled water flows no or nearly no scaling or fouling will occur.

The temperature of the distillate 4 in the distillate storage tank 104 and/or the concentrate 5 in the concentrate storage tank 105 is at least 30 degrees Celsius, preferably at least 40 degrees Celsius. This is about the temperate of the distillate and concentrate when leaving the solar powered water treatment device 1.

The capacity of the third distillate storage tank 104 and the concentrate storage tank 105 is for 100 cubic metre each. This equals to about 400 kWh of stored energy, depending on the salt, for example NaCl concentration of the concentrate.

By storing the distillate 4 in the third distillate storage tank 104 and the concentrate 5 in the concentrate storage tank 105, it is possible to generate at any desired time electric power by feeding the distillate 4 and concentrate 5 through fluid connection 109, 110 to the salinity gradient power device 106. The distillate 4 is being fed in a space between two membranes 111, 112 being located adjacent to a space between two membranes 111, 112 into which the concentrate 5 is being fed. Due to the salient gradient between the concentrate 5 and distillate 4, negative ions will flow in the direction towards anode 114 whilst positive ions will flow in the direction of cathode 113, whereby electric power 107 is being generated. The concentrate has preferably a salt, for example NaCl concentration of at least 0.5 mol/kg, preferably about 0.75 mol/kg if a high conversion efficiency is desired. If high power performance is desired, the concentrate has preferably a salt, for example NaCl concentration that is as high as possible. Take note that with a higher power performance the conversion efficiency will be lower. Such a reversed electrodialyses (RED) device is well known in the art and will not further be explained. The mixture 117 of distillate 4 and concentrate 5 leaving the salinity gradient power device 106 can be discharged.

If a concentrate with a salt, for example NaCl concentration of about 30.8 mol/kg of 1 cubic metre is used in combination with 1 cubic metre of distilled water, the reversed electrodialysis (RED) device can theoretically produce about 4 kWh of electric power. Thus, about 2 kWh/m3 of water (0.5 m2 distillate and 0.5 m2 concentrate). In comparison, using a concentrate of about 5 mol/kg will yield a power performance, however such a reversed electrodialysis (RED) device is at present not very efficient. The theoretical amount of energy in this case is about 2.8 kWh/m3.

By storing the distillate 4 and the concentrate 5 in separate tanks 104, 105 a large amount of potential electric power can easily, cheaply and safely being stored, whilst the electric power will only be generated when needed for example during night-time or when additional electric power is needed. In this manner the solar powered water treatment device 1 can be used always to its maximum capacity.

The controller 27 can also be used to control all components of the device 100.

It is also possible that the electric power 107 generated by the device 100 is being used to supplement the battery 11. In this case, the battery 11 can function as a back-up power source.

It is also possible to place the condenser 30 and heat exchanger 31 in line whereby the non-potable water, like seawater first passes the condenser 30 or heat exchanger 31 and then the other one of the condenser 30 and heat exchanger 31.

It is possible that the solar power system comprises separated devices to generate electric power and heated water, whereby each device operates on solar power. Due to the co-harvesting of both electric power and heated water based on solar power a higher overall efficiency is achieved.

It is also possible to use as salinity gradient power device 106 a pressure retarded osmosis (PRO) device.

The solar powered water treatment device 1 can also be a reverse osmosis (RO) device or a multi-stage flash distillation (MSF) device.

It is possible that the outlet of the salinity gradient power device 106 is connected to the inlet of the solar powered water treatment device 1.

It is possible that the storage tanks 6, 104 are combined into one tank.

It is also possible to use for example a reversed electrodialysis (RED) device and a pressure retarded osmosis (PRO) device in parallel in case that a further stream of brackish/fresh water is available, for example from a river or industry. In such a case the reversed electrodialysis (RED) device can be operated with the distillate and seawater, whilst the pressure retarded osmosis (PRO) device can be operated with the concentrate and the brackish/fresh water, or vice versa.

LIST OF REFERENCE SIGNS 1 solar powered water treatment device
2 water treatment device
3 non-potable water
4 distillate
5 concentrate
6 first distillate storage tank
7 fluid connection
8 solar power system
9 fluid connection
10 electrical connection
11 battery
12 second distillate storage tank
13 fluid connection
14 steam generator
15 fluid connection
16 fluid connection
17 fluid connection
18 fluid connection
19 compressor
20 fluid connection
21 photovoltaic panel
22 flash tank
23 connection
24 pipe
25 pipe
26 pipe
27 controller
28 line
29 line
29 line
30 condenser
31 heat exchanger
100 device
101 solar powered water treatment device
104 third distillate storage tank
105 concentrate storage tank
106 salinity gradient power device
107 electric power
108 electric power grid, load or other electronic devices
109 fluid connection
110 fluid connection
111 cation exchange membranes (CEM)
112 anion exchange membranes (AEM)
113 cathode
114 anode
115 wire
116 wire
117 mixture
H height
L length
P1 arrow

The invention claimed is:

1. A device for storing energy and generating electric power comprising:
   a water treatment device for converting non-potable water into distillate and concentrate,
   a distillate storage tank for storing the distillate,
   a concentrate storage tank for storing the concentrate,
   a salinity gradient power device for generating electric power, wherein the-salinity gradient power device has a fluid connection with the distillate storage tank and the concentrate storage tank,
   wherein the device for storing energy and generating electric power further comprises:
   a solar power system comprising photovoltaic panels and flow paths for guiding distillate along the photovoltaic panels to generate electric power by the photovoltaic panels and to heat distillate from the water treatment device by flowing the distillate in the flow paths along the photovoltaic panels,
   the distillate being distilled water,
   means to transport the heated distillate from the solar power system into the water treatment device to convert the non-potable water into distillate and concentrate,
   means to feed at least part of the distillate of the water treatment device to the solar power system,
   wherein the water treatment device and the salinity gradient power device operate solely on electric power generated by the solar power system and the salinity-gradient power device,
   means to feed at least part of the electric power generated by the solar power system and the salinity-gradient power device to an electric power grid.

2. The device according to claim 1, wherein the salinity gradient power device is a reversed electrodialysis (RED) device.

3. The device according to claim 1, wherein the salinity gradient power device is a pressure retarded osmosis (PRO) device.

4. The device according to claim 1, wherein the solar powered water treatment device is a multiple-effect distillation (MED) device, a multiple-effect distillation (MED) device combined with vapour recompression (VC) device, a reverse osmosis (RO) device or a multistage flash distillation (MSF) device.

5. The device according to claim 1, wherein an outlet of the salinity gradient power device is in fluid connection with an inlet of the solar powered water treatment device.

6. The device according to claim 1, wherein the reversed electrodialysis (RED) device comprises a stack of rectangular membranes, and wherein the length (L) of the membranes extending in a flow direction of distillate and concentrate through the reversed electrodialysis (RED) device is at least 15 centimetre.

7. The device according to claim 6, wherein a height (H) of the rectangular membranes extending perpendicular to the flow direction is at least 1.4 times larger than a length (L) of the rectangular membranes.

* * * * *